United States Patent [19]
Ascough

[11] Patent Number: 5,160,354
[45] Date of Patent: Nov. 3, 1992

[54] PROCESS AND APPARATUS FOR EXTRACTION AND RECOVERY OF BLOWING AGENTS FROM POLYMERIC FOAMS

[75] Inventor: Michael R. Ascough, Oakville, Canada

[73] Assignee: Du Pont Canada Inc., Mississauga, Canada

[21] Appl. No.: 700,011

[22] Filed: May 14, 1991

[51] Int. Cl.$^5$ ............................................. B01D 47/00
[52] U.S. Cl. ............................................ 55/37; 55/52;
  55/201; 210/173; 264/37; 264/DIG. 69
[58] Field of Search ............... 55/16, 37, 52, 199,
  55/201; 210/173, 174; 264/37, 38, 53, DIG. 9, DIG. 69

[56] References Cited

U.S. PATENT DOCUMENTS

| | | | |
|---|---|---|---|
| 2,266,911 | 12/1941 | Schwarz | 210/173 X |
| 3,074,555 | 1/1963 | Rudzinski | 210/173 |
| 3,247,970 | 4/1966 | Jellesma | 210/174 |
| 3,778,974 | 12/1973 | Iwasyk | 55/199 |
| 3,859,404 | 1/1975 | Immel et al. | 264/37 X |
| 4,128,404 | 12/1978 | Stamatiou et al. | 264/37 X |
| 4,287,147 | 9/1981 | Hungerford | 264/37 X |
| 4,531,950 | 7/1985 | Burt | 55/74 X |
| 4,531,951 | 7/1985 | Burt et al. | 55/74 X |
| 4,682,989 | 7/1987 | Maeda et al. | 55/74 X |
| 4,976,862 | 12/1990 | Ascough et al. | 55/16 X |

FOREIGN PATENT DOCUMENTS

| | | | |
|---|---|---|---|
| 1607425 | 9/1969 | Fed. Rep. of Germany | 210/174 |
| 53-019386 | 2/1978 | Japan | 264/37 |

Primary Examiner—Robert Spitzer
Attorney, Agent, or Firm—James E. Shipley

[57] ABSTRACT

An apparatus and process for removing blowing agent from polymeric foam. The apparatus comprises a comminution zone into which extraction liquid and polymeric foam may be introduced. The upper end of the zone is of larger cross-sectional area and tapers to a lower end of a smaller cross-sectional area. A plurality of blades are located within the comminution zone, and are adapted to comminute the polymeric foam and impart a vortex to the liquid and foam. A quiescent zone is directly connected to the lower end of the comminution zone so that comminuted polymeric foam and extraction liquid may be passed directly from the comminution zone to the quiescent zone. Baffles for attenuating the vortex created in the comminution zone are located within the quiescent zone. The foam then rises to the top of the quiescent zone and is removed.

9 Claims, 3 Drawing Sheets

PROCESS AND APPARATUS FOR EXTRACTION AND RECOVERY OF BLOWING AGENTS FROM POLYMERIC FOAMS

BACKGROUND OF THE INVENTION

This invention relates to processes and apparatuses for the extraction and recovery of blowing agents from polymeric foams.

It is desirable to extract and recover blowing agents from polymeric foams to determine the amount of blowing agent that was present in the foam, reclaim the blowing agent and/or reclaim the polymer. It is especially important to recover blowing agents from scrap foams since emissions of blowing agents to the atmosphere may cause damage to the environment. Also, reuse of the blowing agents enhances the economics of the foam manufacturing process.

Apparatuses have been developed to recover and reclaim blowing agents from thermoplastic and thermoset foams during their manufacture to reduce loss of blowing agent. In these processes, air is passed over foam manufacturing lines and scrap foam recovery units to sweep away any excess blowing agents. The resultant air/blowing agent mixture is then separated.

U.S. Pat. No. 4,531,951 (Cellu Products Company) discloses a blowing agent recovery unit for recovering blowing agent from foam during production. This unit comprises an enclosed area surrounding the exit of the foam extruder. A fan or a blower sucks the stream of blowing agent in air out of the enclosed area and sends it to an activated carbon adsorption unit. A blowing agent-rich stream is sent from the carbon adsorption unit to a condenser. Water is condensed out of the stream at the condenser. The blowing agent-rich stream is then sent to a compressor. This stream is then compressed and the blowing agent is thereby liquefied. The blowing agent is then passed through a pressurized vessel and the blowing agent settles to the bottom of this vessel and is removed via a valve at the bottom of the vessel.

U.S. Pat. No. 4,531,950 (Cellu Products Company) discloses a similar blowing agent recovery unit to the unit disclosed in the above-mentioned patent which also includes a scrap foam recovery unit. This unit grinds foam into small particles and pneumatically conveys the resultant particles and air-fluorocarbon mixture to a cyclone separator. Some of the air-fluorocarbon mixture obtained is then recycled for pneumatic conveying and some of it is sent to the main blowing agent recovery unit for separation of the air and the blowing agent.

The present invention is suitable for the process described in U.S. Pat. No. 4,976,862 (Du Pont Canada Inc.), the contents of which are incorporated herein by reference. The process described in the aforementioned patent comprises breaking up polymeric foam in a liquid medium to obtain a solid phase of polymeric fragments and a liquid phase of the blowing agent and liquid medium. The solid phase is then separated from the liquid phase. Optionally, in the liquid phase, the blowing agent may be separated from the liquid medium by distillation or decantation.

SUMMARY OF THE INVENTION

An apparatus and process for extracting blowing agents from foams which recovers substantially more blowing agent and/or which recovers the blowing agent more efficiently than conventional apparatuses and processes is desired.

Accordingly, the invention provides an apparatus for removing blowing agent from polymeric foam. The apparatus comprises a comminution zone into which extraction liquid and polymeric foam may be introduced, and wherein the upper end of the zone is of larger cross-sectional area and tapers to a lower end of a smaller cross-sectional area. Comminuting means are located within the comminution zone and are adapted to comminute the polymeric foam and to impart a vortex to the liquid and polymeric foam in the comminution zone, thereby concentrating the comminuted polymeric foam in the region adjacent to the lower end of the zone. A quiescent zone is directly connected to the lower end of the comminution zone. Attenuating means for attenuating the vortex created in the comminution zone are located within the quiescent zone.

The present invention allows efficient removal of blowing agent from foam. The combination of the sloping walls of the comminution zone and the comminution means causes the polymeric foam to be concentrated into a mass in the lower end of the comminution zone, from which it is immediately passed into the quiescent zone. The concentrated mass has greater buoyancy than individual comminuted polymeric particles and so may rise relatively quickly to the surface of the quiescent zone. The comminuted polymeric particles may then be removed from the surface of the quiescent zone.

BRIEF DESCRIPTION OF THE DRAWINGS

Preferred embodiments of the invention will be further described, by way of illustration only, with reference to the following drawings, in which.

DESCRIPTION OF THE PREFERRED EMBODIMENTS

Figure 1:
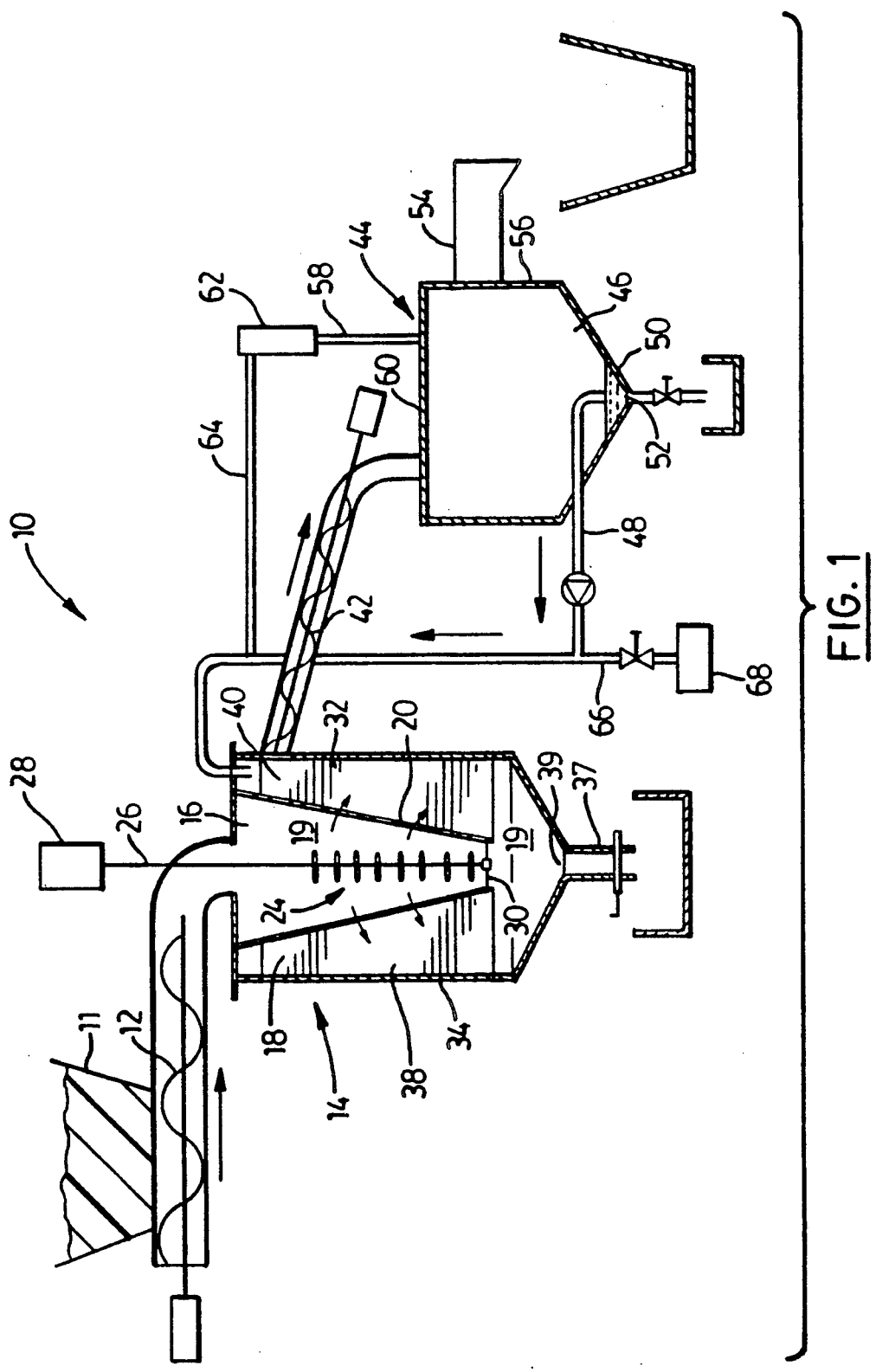
FIG. 1 is a flow diagram of an apparatus for removing blowing agent from polymeric foam.

Referring to FIG. 1, it may be seen that a particularly preferred embodiment of an apparatus 10 for removing blowing agent from foam comprises a container 11 which is situated above a feed auger 12. The auger 12 connects the container 11 to an extraction vessel 14 having a centrally-located comminution zone 16 and surrounding quiescent zone 18. Extraction liquid 19 is present in both the comminution zone 16 and the quiescent zone 18.

Details of the comminution zone 16 and the quiescent zone 18 will now be described with reference to FIGS. 2A and 2B. It may be seen in FIG. 2A that the comminution zone 16 is defined by a wall 20 generally shaped like a truncated cone and having perforations 21 therein to allow fluid communication between the comminution zone 16 and the quiescent zone 18. The angle of inclination of the wall 20, relative to its vertical axis, is preferably from about 15 to 45 degrees. As may be seen in FIG. 2B, the wall 20 has a number of evenly spaced flutes 22 extending along its entire length.

Referring back to FIG. 2A, it may be seen that a plurality of blades 24 is positioned centrally within the comminution zone 16. These blades 24 are mounted on a vertical, rotatable shaft 26 driven by a motor 28.

The wall 20 has an open lower end 30 large enough to permit the passage of concentrated comminuted polymeric foam into the quiescent zone 18. The quiescent zone 18 is located in an annulus 32 between the wall 34 of the extraction vessel 14 and the wall 20 of the comminution zone 16. A series of baffles 38 are located within the quiescent zone 18 and are welded to the wall 34 of the extraction vessel 14.

A lower outlet 37 is provided at the base 39 of the extraction vessel 14 for occasional removal of excessive amounts of sediment build-up.

Referring back to FIG. 1, the top 40 of the quiescent zone 18 is connected to a slurry auger 42. This slurry auger 42 connects the quiescent zone 18 to a solid/liquid separation vessel 44. This solid/liquid separation vessel 44 may be either a centrifuge or a filter.

The solid/liquid separation vessel 44 connects in its lower region 46 to a recycle line 48 which leads back to the top 40 the quiescent zone 18. The vessel 44 is also provided at its base 50 with a drain 52 which allows excessive sediment buildup to be removed from the bottom. An outlet for solids 54 is further provided in the side wall 56 of the solid/liquid separation vessel 44.

A riser 58 extends vertically from the top 60 of the solid/liquid separation vessel 44 and is connected to a condenser 62. A line 64 connects the condenser 62 to the recycle line 48.

The recycle line 48 has an outlet 66 for the removal of extraction liquid 19 together with recovered blowing agent. This outlet 66 connects to a liquid/liquid separation device 68 which may be either a decanting device or a distillation device. If the extraction liquid 19 and the blowing agent are the same liquid, then the blowing agent may be recovered by simple removal, so the liquid/liquid separation device 68 is unnecessary.

The present invention may be operated continuously or batch-wise. The continuous operation of the apparatus 10 for removing blowing agent from polymeric foam will now be described with reference to FIGS. 1, 2A and 2B. Polymeric foam is initially received by the container 11 from which it is then transported by the feed auger 12 to the comminution zone 16 of the extraction vessel 14 containing extraction liquid 19. The polymeric foam is comminuted in the comminution zone 16 by the blades 24. Comminution is optimized by the flutes 22 of the wall 20 of the comminution zone 16, which increases turbulence along the wall 20 to minimize the accumulation of particulate matter. Comminution allows the release of blowing agent trapped in the cells of the foam into the extraction liquid 19. The rotating motion of the blades 24 combined with the frustroconical shape of the wall 20 results in the creation of a vortex. This vortex forces the comminuted polymeric foam downwards and thereby concentrates the comminuted foam at the lower end 30 of the comminution zone. The comminuted foam in the form of a concentrated mass is thereby passed through this lower end 30 and into the quiescent zone 18. The baffles 38 in the quiescent zone 18 attenuate the turbulence created in the comminution zone by the vortex, thereby causing the liquid to become substantially quiescent. The concentrated mass of comminuted polymeric foam floats to the top 40 of the extraction vessel 14 through the quiescent zone 18. Comminuted polymeric foam and entrained liquid are then removed from the extraction vessel 14 by the slurry auger 42.

The slurry auger 42 transports the foam and entrained liquid to the solid/liquid separation vessel 44. In this vessel 44, any extraction liquid and blowing agent contained within the concentrated comminuted foam mass will be separated from the solid mass. Some of the liquid will be recycled back to the quiescent zone 18 via the recycle line 48, while some liquid will be removed from the recycle line 48 via the outlet 66. Pure blowing agent is then recovered from the portion that is removed. This may be accomplished by means of decanting or distillation in the liquid/liquid separation device 68 if the extraction liquid 19 and the blowing agent are not the same liquids.

If the solid/liquid separation vessel is a centrifuge, then heat may be generated by centrifugation causing a significant rise in temperature. This rise in temperature may cause partial vapourization of the extraction liquid, especially if this liquid has a high volatility, and create a vapour-pressure equilibrium within the solid/liquid separation vessel 44. In order to maximize the amount of extraction liquid recycled, any vapour formed will be condensed within the condenser 62. This condensed extraction liquid is then introduced to the recycle line 48 for return to the quiescent zone 18.

Figure 2A:
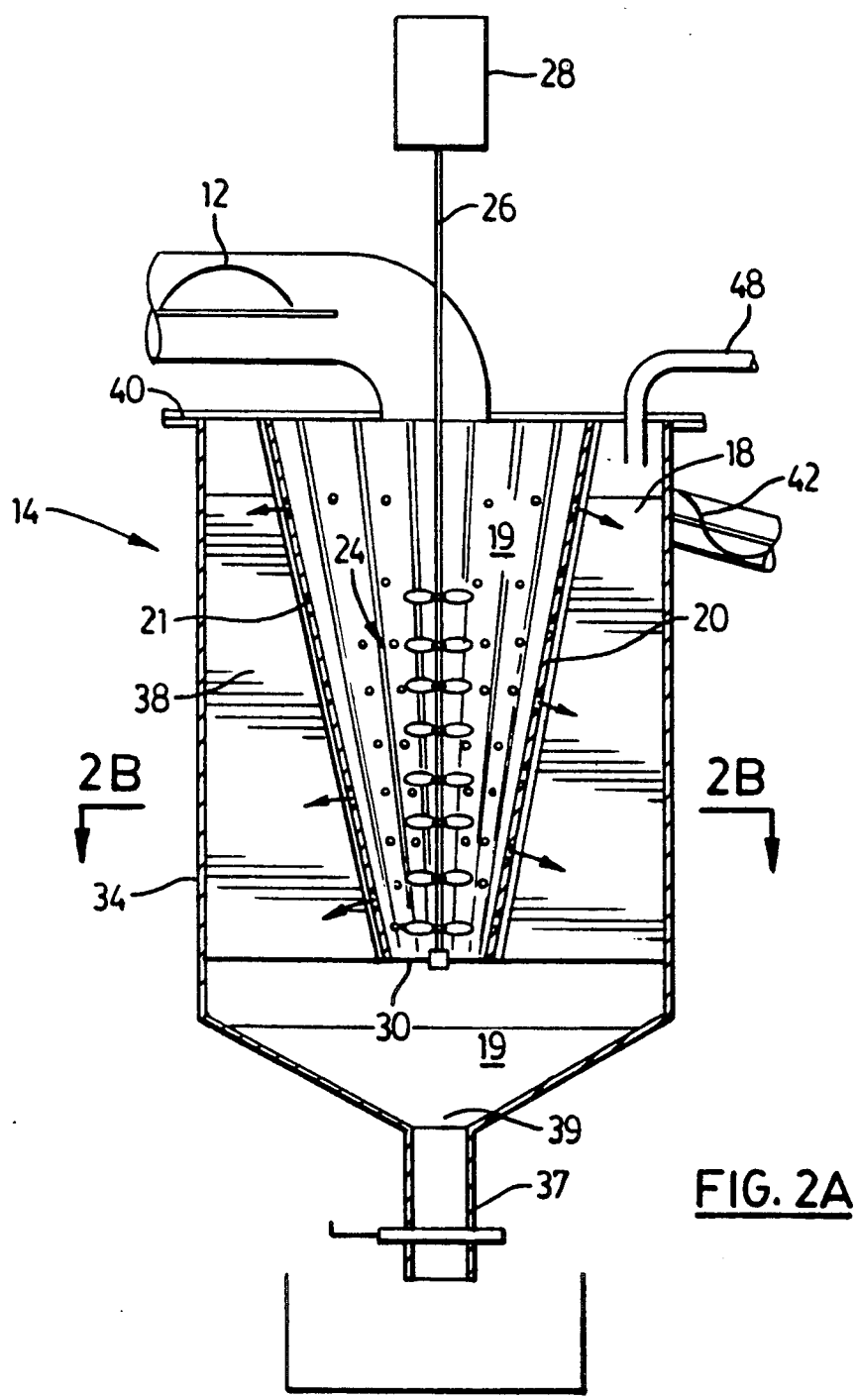
FIG. 2A is a flow diagram of an extraction vessel for use in the apparatus of FIG. 1.
Figure 2B:
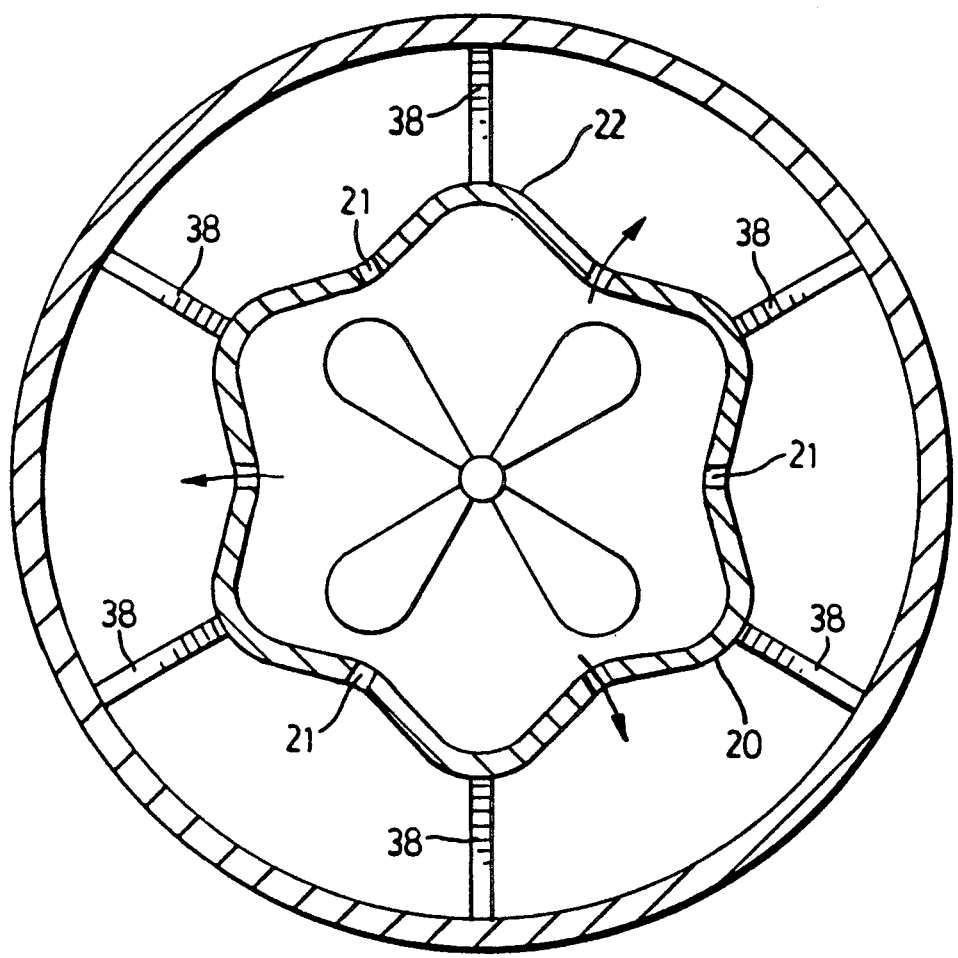
FIG. 2B is a cross-sectional view of the extraction vessel of FIG. 2A along line 2B—2B.

The present invention may be operated batchwise using the apparatus of FIGS. 2A and 2B. The process is essentially the same as the coninuous process except that the scrap foam is not continuously fed into the vessel and the extracted blowing agent and recovered polymeric comminuted foam are not continuously removed from it.

I claim:

1. A process for extraction and recovery of blowing agent contained within polymeric foam, said process comprising the steps of:
   comminuting said polymeric foam in extraction liquid within a comminution zone, thereby releasing said blowing agent into said extraction liquid;
   creating a vortex within said comminution zone, to force the comminuted polymeric foam downwards and out of said comminution zone and simultaneously concentrate said polymeric foam into a mass at the lower end of said comminution zone; and
   passing the concentrated mass of polymeric foam directly into a quiescent zone in which said vortex is attenuated by attenuation means and allowing said concentrated polymeric foam to float to the surface of said quiescent zone.

2. An apparatus for extraction and recovery of blowing agent contained within polymeric foam, said apparatus comprising:
   a comminution zone, into which extraction liquid and said polymeric foam is introduced, and wherein the upper end of said zone is of larger cross-sectional area and tapers to a lower end of a smaller cross-sectional area;
   comminuting means located within said zone, said comminuting means adapted to comminute polymeric foam and to impart a vortex to said liquid and polymeric foam in comminution zone, thereby concentrating the comminuted polymeric foam in the region adjacent to the lower end of said zone;
   a quiescent zone directly connected to the lower end of said comminution zone for fluid communication therewith; and
   attenuating means, for attenuating the vortex, said attenuting means being located within said quiescent zone.

3. An apparatus as claimed in claim 2, wherein said comminution zone is in the shape of a truncated cone.

4. An apparatus as claimed in claim 3, wherein the angle of inclination of said truncated cone relative to the vertical axis of said cone is from 15 to 45 degrees.

5. An apparatus as claimed in claim 2, wherein the wall of said comminution zone is fluted.

6. An apparatus as claimed in claim 2, wherein said comminuting means comprises a plurality of blades.

7. An apparatus as claimed in claim 2, wherein said attenuating means comprises a plurality of baffles.

8. An apparatus as claimed in claim 2 wherein said comminution zone is defined by at least one perforated wall.

9. An apparatus for extraction and recovery of blowing agent contained within polymeric foam, said apparatus comprising:
   a solid container for receiving polymeric foam;
   first conveying means for transporting polymeric foam from the first containing means;
   a comminution zone into which said polymeric foam is introduced by said first conveying means and into which extraction liquid is introduced, said comminution zone comprising comminuting means located within said zone, said comminuting means adapted to comminute polymeric foam and to impart a vortex to said liquid and polymeric foam in said comminution zone, thereby concentrating the comminuted polymeric foam in the region adjacent to the lower end of said zone;
   a quiescent zone directly connected to the lower end of said comminution zone for fluid communication therewith;
   attenuating means, for attenuating turbulence created by the vortex, said attenuating means being located within said quiescent zone;
   second conveying means for removing said comminuted polymeric foam from said quiescent zone;
   a liquid/solid separator for receiving said comminuted polymeric foam and said liquid from said second conveying means, said liquid/solid separator adapted to separate said liquid from said comminuted polymeric foam; and
   recycling means adapted to return separated liquid from said liquid/solid separator to said quiescent zone.

* * * * *